(12) United States Patent
Zhu et al.

(10) Patent No.: US 11,762,894 B2
(45) Date of Patent: Sep. 19, 2023

(54) EVENT MANAGEMENT IN COMPUTER SYSTEM

(71) Applicant: International Business Machines Corporation, Armonk, NY (US)

(72) Inventors: Zi Xiao Zhu, Zibo (CN); Pei Ni Liu, Beijing (CN); Tian Wu, Beijing (CN); Fan Jing Meng, Beijing (CN); HariGovind Venkatraj Ramasamy, Round Rock, TX (US); Sandhya Narayan, Saratoga, CA (US); Elliot Karl Kolodner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 17/456,653

(22) Filed: Nov. 29, 2021

(65) Prior Publication Data

US 2023/0169104 A1 Jun. 1, 2023

(51) Int. Cl.
*G06F 16/35* (2019.01)
*G06F 40/211* (2020.01)
*G06F 40/30* (2020.01)

(52) U.S. Cl.
CPC ............ *G06F 16/35* (2019.01); *G06F 40/211* (2020.01); *G06F 40/30* (2020.01)

(58) Field of Classification Search
CPC ......... G06F 16/35; G06F 40/211; G06F 40/30
USPC ........................................................ 707/739
See application file for complete search history.

(56) References Cited

U.S. PATENT DOCUMENTS

| | | |
|---|---|---|
| 8,260,773 B2 | 9/2012 | Jennings, III |
| 9,317,829 B2 * | 4/2016 | Anand ................... G06F 16/35 |
| 10,067,760 B2 | 9/2018 | Ryali |
| 2010/0161539 A1 | 6/2010 | Kandanala |
| 2014/0107925 A1 * | 4/2014 | Chang ................... G06Q 90/00 |
| | | 702/123 |

(Continued)

FOREIGN PATENT DOCUMENTS

EP 3193265 A1 7/2017

OTHER PUBLICATIONS

Beneker ert al., "Using Clustering for Categorization of Support Tickets", Copyright @ 2017 by the paper's authors, 12 pages, <http://ceur-ws.org/Vol.1917/paper10.pdf>.

(Continued)

*Primary Examiner* — Cam Linh T Nguyen
(74) *Attorney, Agent, or Firm* — Brian M. Restauro

(57) ABSTRACT

Embodiments of the present invention relate to methods, systems, and computer program products for event management. In a method, a plurality of notes that are comprised in a plurality of event records are obtained in a computer system. A plurality of paragraphs that are comprised in the plurality of notes are classified into a plurality of content types based on a content analysis of the plurality of paragraphs. The plurality of notes are classified into a plurality of semantic types based on the plurality of content types and a syntactic parsing to the plurality of notes. A knowledge item is generated for managing an event in the computer system based on a group of notes in the plurality of notes that are classified into the plurality of semantic types. With these embodiments, knowledge items for managing events may be obtained in an easier and more effective way.

20 Claims, 6 Drawing Sheets

(56) References Cited

U.S. PATENT DOCUMENTS

2018/0253736 A1 9/2018 Rajaram
2018/0267976 A1* 9/2018 Bordawekar ....... G06F 16/3347
2018/0285768 A1 10/2018 Karuppasamy
2020/0012728 A1 1/2020 Jan
2022/0382784 A1* 12/2022 Osuala ................. G06F 16/285

OTHER PUBLICATIONS

Disclosed Anonymously, "System And Method For Automated Classification Of Content In It Service Management Using Lifelong Machine Learning", An IP.com Prior Art Database Technical Disclosure, IP.com No. IPCOM000258715D, IP.com Electronic Publication Date: Jun. 7, 2019, 5 pages.

Roy et al., "Clustering and Labeling IT Maintenance Tickets", @ Springer International Publishing Switzerland 2016, DOI: 10.1007/978-3-319-46295-0 58, 17 pages, <https://link.springer.com/chapter/10.1007/978-3-319-46295-0 58>.

Mell et al., "The NIST Definition of Cloud Computing", Recommendations of the National Institute of Standards and Technology, NIST Special Publication 800-145, Sep. 2011, 7 pages.

* cited by examiner

EVENT MANAGEMENT IN COMPUTER SYSTEM

BACKGROUND

The present invention relates to computer system management, and more specifically, to methods, systems and computer program products for managing an event that occurred in the computer system.

Typically, a computer system may comprise one or more computer devices and each of the computer devices may involve complex hardware and software configurations. During operations of the computer system, various types of events (such as an error, an alarm, and the like) may occur and then these events may be reported to technical engineers, for example, via event records. The technical engineers may check states of the computer system and then decide a resolution for trouble shooting based on a knowledge database (which comprises different knowledge items for managing different events) together with his/her experience.

SUMMARY

According to one embodiment of the present invention, there is provided a computer-implemented method that may be implemented by one or more processors. In the method, one or more processors obtain a plurality of notes that are comprised in a plurality of event records in a computer system, here an event record in the plurality of event records describes an event that occurred in the computer system. One or more processors classify a plurality of paragraphs that are comprised in the plurality of notes into a plurality of content types based on a content analysis of the plurality of paragraphs. One or more processors classify the plurality of notes into a plurality of semantic types based on the plurality of content types and a syntactic parsing to the plurality of notes, here the plurality of semantic types comprise at least a symptom type and a resolution type. One or more processors generate a knowledge item for processing an event in the computer system based on a group of notes in the plurality of notes that are classified into the plurality of semantic types.

According to another embodiment of the present invention, there is provided a computer-implemented system. The computer-implemented system comprises a computer processor coupled to a computer-readable memory unit, where the memory unit comprises instructions that when executed by the computer processor implements the above method.

According to another embodiment of the present invention, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
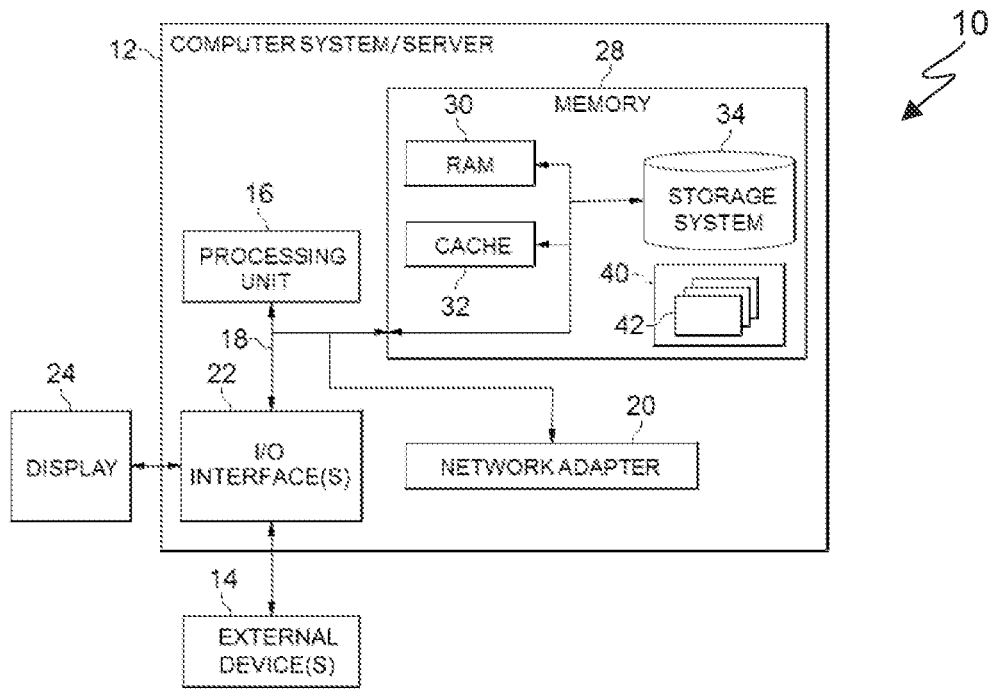
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
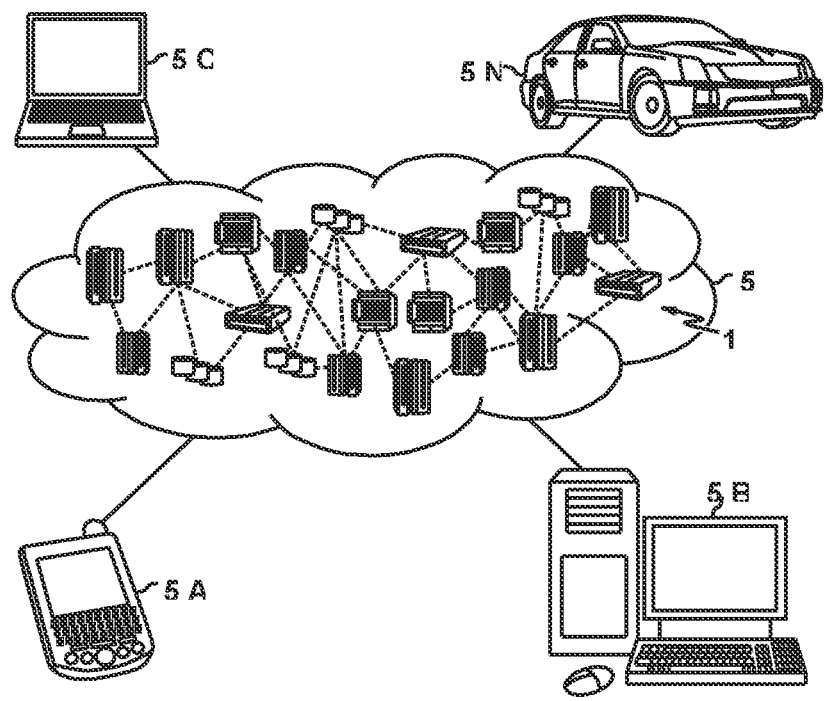
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
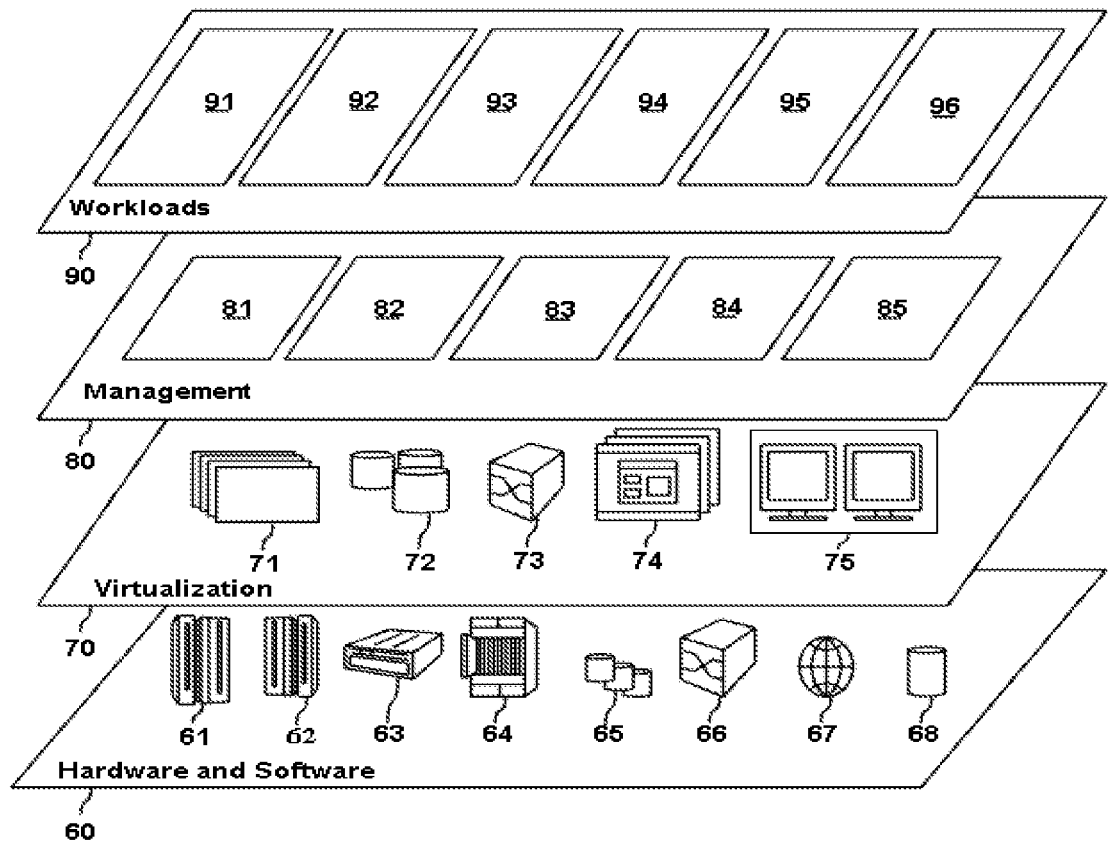
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the event processing 96.

It should be noted that the event processing 96 according to embodiments of the present invention could be implemented by computer system/server 12 of FIG. 1. A working environment of the present invention will be described below. For the sake of clarity, embodiments of the present invention will be descripted by taking a storage system as an example of the computer system. Here, the storage system may provide data storage service to various users. For example, a user may access the storage system via his/her terminal device and upload/download user data to/from the storage system. It is to be understood that the storage system is just an example environment where embodiments of the present invention may be implemented. The present invention may be implemented in other computer systems such as a communication system, a computing system, an email system and the like.

Figure 4:
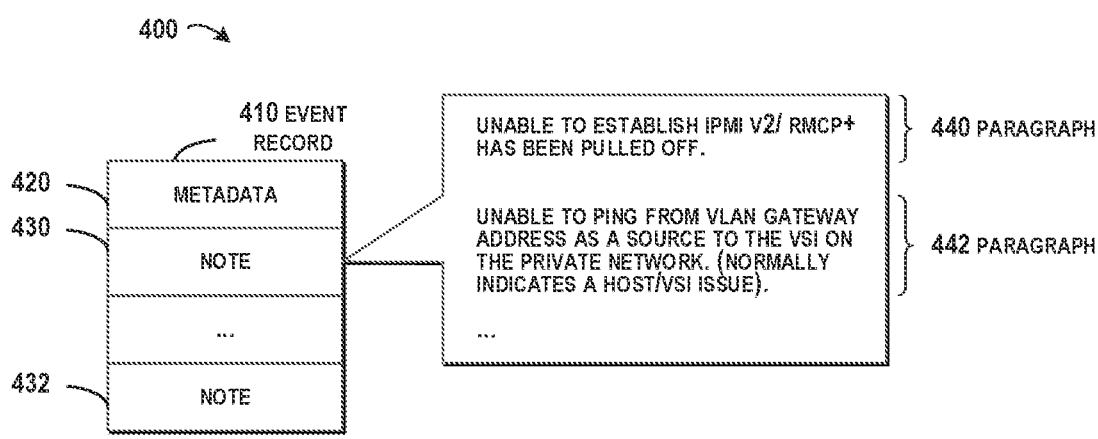
FIG. 4 depicts an example data structure of an event record in a computer system.

During operations of the computer system, various events (such as errors, alarms, requests, incidents, and the like) may occur in the computer system. For example, a user may be unable to connect to his/her storage space in the storage system, and then the user may submit an event record to a service center of the storage system. Reference will be made to FIG. 4 for a brief structure of the event record. FIG. 4 depicts an example data structure 400 of an event record 410 in a computer system. The event record 410 may include metadata 420, which may include brief information of the event such as a title, a severity level, and the like. The event record 410 may also include one or more notes for providing more details about the event at various time points since the event is reported. For example, the first note 430 may be added by the user who discovered the connection error, and the first note 430 may describe symptoms that occurred and other notes such as note 432 and so on. As shown in FIG. 4, the note 430 may include one or more paragraphs such as paragraph 440 and 442. Further, the event record 410 may include more notes made by another author. For example, a technical engineer may implement various diagnosis operations for checking the computer system and then find a resolution for repairing. The technical engineer may add one or more notes for describing the above activities into the event record 410. If he/she cannot fix the problem, the engineer may turn to a senior engineer for help, and then the senior engineer may add his/her notes into the event record 410.

Approaches have been provided for extracting knowledge from history event records. For example, technical experts may analyze the history event records and find typical symptoms and corresponding resolutions. However, these approaches greatly depend on expert knowledge and manual work, and the huge data amount of the history event records cannot be processed by human power. Accordingly, it is desired to provide a new approach for managing events in the computer system in a more convenience and effective way.

Figure 5:
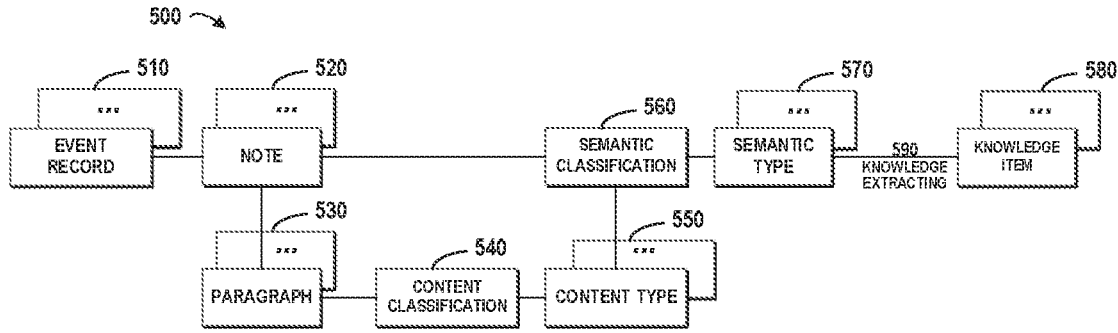
FIG. 5 depicts an example procedure for determining a knowledge item for managing an event in a computer system according to an embodiment of the present invention.

In view of the above drawbacks, embodiments of the present invention provide approaches for managing events in the computer system. Reference will be made to FIG. 5 for a brief of embodiments of the present invention. FIG. 5 depicts an example procedure for generating a knowledge item for managing an event in a computer system according to an embodiment of the present invention. In FIG. 5, a plurality of event records 510 may be collected in the computer system. Here, the data structure of the event records 510 may be similar as that depicted in FIG. 4, and then a plurality of notes 520 and a plurality of paragraphs 530 may be obtained from those event records 510. Further, each paragraph in the plurality of paragraphs 530 may be subject to a content classification 540, which may classify the plurality of paragraphs 530 into multiple content types 550 according to a content analysis to each paragraph. Further, the plurality of notes 520 together with the content type 550 may be subject to a semantic classification 560, which classifies the plurality of notes 520 into multiple semantic types 570 comprising at least a symptom type and a resolution type. A knowledge extracting procedure 590 may be implemented so as to obtain knowledge item(s) 580 for managing event(s).

With these embodiments, the great amount of history event records 510 may be processed in an automatic manner effectively, which reduces the human workload greatly and increase the performance in the computer system. Further, each note in the event records and each paragraph in each note are analyzed for determining a semantic type of each note, therefore notes that describing symptoms and resolutions for handling the symptoms may be found correctly and effectively from the event records 510. Accordingly, the knowledge item 580 may be generated on a correct and effective basis.

Figure 6:
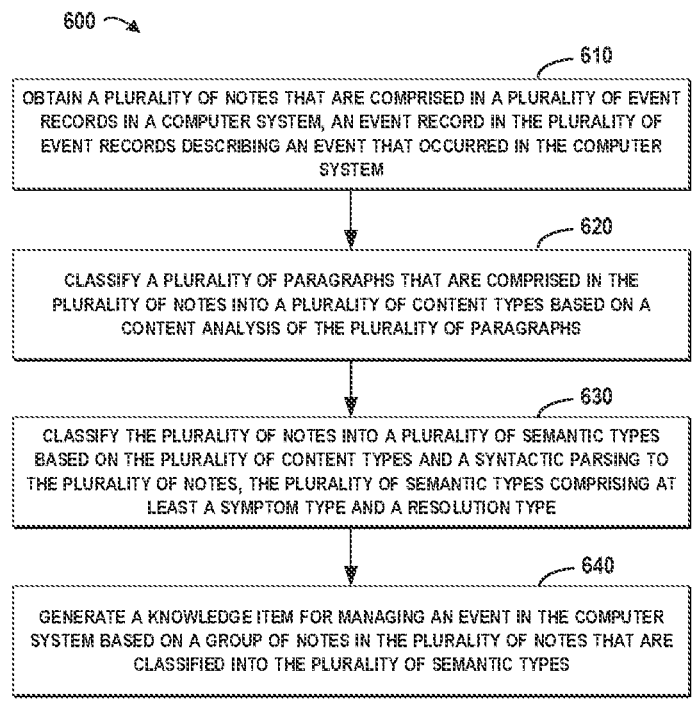
FIG. 6 depicts a flowchart of an example method for determining a knowledge item for managing an event in a computer system according to an embodiment of the present invention.

Hereinafter, reference will be made to FIG. 6 for more details about the present invention. FIG. 6 depicts a flowchart of an example method 600 for determining a knowledge item for managing an event in a computer system according to an embodiment of the present invention. At a block 610, a plurality of notes 520 that are comprised in a plurality of event records 510 are obtained in a computer system. Here an event record in the plurality of event records describes an event that occurred in the computer system. Here, each event record may describe a history event that has occurred in the computer system. For example, an event record may describe an event related to a connection error, and another event record may describe a user request for expanding the storage space. According to one embodiment of the present invention, the plurality of event records 510 may be obtained from a log system of the computer system, and each of the event record may be identified, for example by a timestamp of the note, and then all notes that are comprised in the event record may be identified.

Here, the note may record various aspects of the event. For example, Table 1 shows examples of notes and their corresponding types.

TABLE 1

Example Note

| No. | Note | Type |
|---|---|---|
| 1 | ESCing and pulling back for now for metrics/dev; still working on this per SLiki<br>Company Name: IBM - PODC Sub Account 01 -<br>--- 10.\*.\*.\* ping statistics --- 3 packets transmitted 3 received 0% packet loss time 2001 ms rtt min/avg/max/mdev = 0.657/0.802/1.044/0.173 ms<br>Apr. 16, 2019 12:22:01 (GMT-0500) Yes Waiting for Event Install Complete; no PI errs IMG actions complete | System log |
| 2 | user@host~]$ nmap -p 80 443 8443 10.142.99.248<br>Starting Nmap 5.51 ( http://\*\*\*.org ) at Apr. 16, 2019 13:10 CDT<br>Nmap scan report for 10.\*.\*.\*<br>Host is up (0.031 s latency).<br>PORT STATE SERVICE<br>80/tcp closed http<br>443/tcp closed https<br>8443/tcp closed https-alt<br>Nmap done: 1 IP address (1 host up) scanned in 0.18 seconds<br>[user@host~]$ | Command-line Inputs/Outputs |

TABLE 1-continued

Example Note

| No. | Note | Type |
|---|---|---|
| 3 | DC please open a ticket with the customer. Those ports need to be opened in order fo this to successfully complete registration. | Plain text |
| 4 | Redhat EL 7.0-64 Minimal for VSI (root : U*)<br>o Manufacturer License: FAILED_*<br>o RHEL License: bVpuc*** | Configuration/ Report |
| 5 | Ticket was opened setting this to resolved:<br>https ://* * * .com/ticket . . . | URL |
| 6 | Restart the terminal device, and then enter into the network configuration interface, . . . | Plain text |
| . . . . . . | | |

In Table 1, the first column indicates the number of the note, the second column indicates the content of the note, and the third column indicates the type of the note. For example, the first note belongs to the system log type, the second note belongs to the command-line type, and the third and sixth notes belong to the plain text type which describes the problem that the user met. It is to be understood that the multiple notes are just examples which describe various aspects of the event, and these notes may come from the same or different event records, and each paragraph in these notes may be classified into a corresponding content type.

At a block 620, a plurality of paragraphs 530 that are comprised in the plurality of notes 520 are classified into a plurality of content types 550 based on a content analysis of the plurality of paragraphs 530. According to one embodiment of the present invention, each of the plurality of notes 520 may be analyzed to identify the plurality of paragraphs 530. For example, the paragraph may be identified by punctuations such as ".", "!" and the like for indicating an end of a paragraph. Then, the content analysis may be implemented to the plurality of paragraphs 530 for the classification. Specifically, the content analysis may be implemented based on the machine learning technique for the classification. A corresponding content feature may be extracted from each paragraph for further processing and hereinafter reference will be made to FIG. 7 for a brief of the content feature.

At a block 630, content classification 540 using content classifying model classifies the plurality of notes into a plurality of semantic types based on the plurality of content types and a syntactic parsing to the plurality of notes. In this embodiment, the plurality of semantic types comprise at least a symptom type and a resolution type.

At a block 640, content classification 540 generates a knowledge item for managing an event in the computer system based on a group of notes in the plurality of notes that are classified into the plurality of semantic types.

Figure 7:
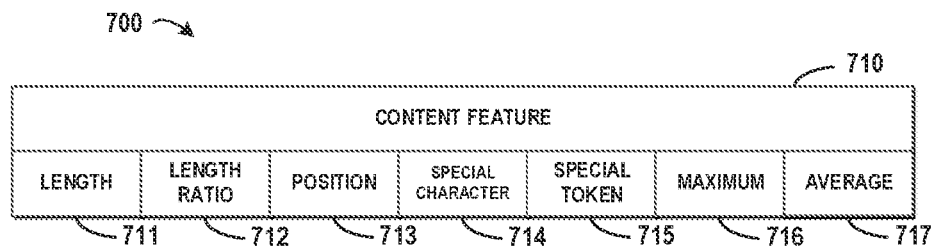
FIG. 7 depicts an example data structure of a content feature according to an embodiment of the present invention.

FIG. 7 depicts an example data structure 700 of a content feature 710 according to an embodiment of the present invention. In FIG. 7, the content feature 710 for a paragraph may comprise multiple fields such as a length 711, a length ratio 712, a position 713, a special character 714, a special token 715, a maximum 716, and an average 717. Here, the length 711 may indicate a length of the paragraph, and it may be measured by the number of characters in the paragraph. For example, if the paragraph includes 100 characters, then the length 711 may be set to 100. The length ratio 712 may indicate a ratio between the length 711 of the paragraph and a length of a subsequent (or previous) paragraph of the paragraph. For example, if the subsequent paragraph includes 120 characters, then the length ratio may be set to 100/120.

The position 713 may indicate a position of a note where the paragraph locates. Supposing the paragraph is in the third note of an event record including ten notes, the position 713 may be set to 3/10. The special character 714 may indicate a ratio between the number of special characters (such as characters other than 0-9, a-z, and A-Z) and total character number of the paragraph. The special token 715 may include various types based on regular expression pattern matching shown in Table 2.

TABLE 2 regular expression pattern matching

| Special Token | Regular Expression |
|---|---|
| Number | [0-9]* |
| Alphanumeric Token | [0-9a-zA-Z]+ |
| URL | http[s]?://(?:[a-zA-Z]\|[0-9]\|[$-_@.&+]\|[!*\(\),]\|(?:%[0-9a-fA-F][0-9a-fA-F]))+ |
| IP | (([0-9]\|[1-9][0-9]\|1[0-9]{2}\|2[0-4][0-9]\|25[0-5])\.){3}([0-9]\|[1-9][0-9]\|1[0-9]{2}\|2[0-4][0-9]\|25[0-5]) |
| UUID | [A-Fa-f0-9]{8}-(?:[A-Fa-f0-9]{4}-){3}[A-Fa-f0-9]{12} |
| Time/Date/etc. | ([01]?[0-9]\|2[0-3]):[0-5][0-9] |
| Email | ([a-z0-9_\.-]+)@([\da-z\.-]+)\.([a-z\.]{2,6}) |
| FQN | [a-zA-Z][a-zA-Z0-9]*)(\.[a-zA-Z][a-zA-Z0-9]*)+ |
| Path | (?:(?:[a-zA-Z]:\|\\\\[a-zA-Z0-9_.$•-]+\\[a-zA-Z0-9_.$•-]+)\\\|\\?[\\/:*?"<>\|\r\n]+\\?)(?:[\\/:*?"<>\|\r\n]+\\)*[\\/:*?"<>\|\r\n]* |
| Version # | [vV]?[0-9]+\.[0-9]+\.[0-9]+(?:\.[0-9]+)? |
| Cmd-line head | . . . |
| Plain text | Other than the above |

In Table 2, the first column shows a type of the special token, and the second column shows a regular expression corresponding to the type. Here, the regular expression pattern matching may be implemented to each paragraph for determining how many special tokens are included in the paragraph for each type. Accordingly, the special token 715 may include one or more items corresponding to the one or more types that exist in the paragraph. Alternatively, if the paragraph includes no special token, the special token 715 may be set to "NULL." Further, the content feature 710 may include statistic data associated with words in the paragraph. For example, the maximum 716 may indicate a maximum word number in consecutive word sequences in the paragraph, and the average 717 may indicate an average of the word numbers in the paragraph. It is to be understood that the above Table 2 is just an example data structure for the content feature 710. In another embodiment of the present invention, the content feature 710 may include more or less fields.

According to one embodiment of the present invention, a corresponding content feature may be determined for each paragraph, therefore a plurality of content features may be determined for the plurality of paragraphs 530 based on the content analysis to the plurality of paragraphs, respectively. Further, a content classifying model may be obtained for representing an association between a content feature of a paragraph and a content type of the paragraph. The content classifying model may be trained in advance based on the machine learning technique. For example, a training dataset including multiple data samples may be obtained, and each data sample may include a paragraph and a corresponding content type of the paragraph which is labeled by the technical experts. For example, based on the types shown in Table 1, the plurality of content types may comprise a plain text type, a system log type, a command-line type, a configuration type, and an URL type. Further, a corresponding content feature may be extracted from each paragraph and then each data sample may indicate an association between the content feature of the paragraph and a corresponding content type of the paragraph.

It is to be understood that the above paragraph just provides a general procedure for training the content classifying model. Alternatively and/or in addition to, the content classifying model may be obtained by methods that have been provided in the past or to be developed in the future. Meanwhile, various machine learning models may be used for representing the content classifying model, as along as the trained model may represent the association between content features and content types.

Figure 8:
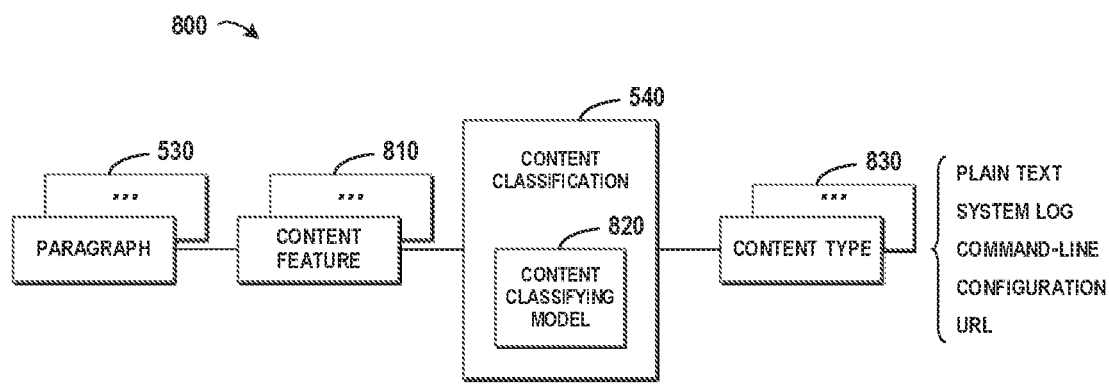
FIG. 8 depicts an example procedure for classifying a plurality of paragraphs into a plurality of content types according to an embodiment of the present invention.

According to embodiments of the present invention, the content classifying model may be trained by data samples in the training dataset, such that the content classifying model may represent an association between a content feature of a paragraph and a content type of the paragraph. Further, the plurality of paragraphs 530 may be classified into the plurality of content types based on the plurality of content features and the content classifying model. FIG. 8 depicts an example procedure 800 for classifying a plurality of paragraphs 530 into a plurality of content types 830 according to an embodiment of the present invention. As depicted in FIG. 8, once the content classifying model 820 is trained, it may be used for the content classification 540. The plurality of paragraphs 530 may be processed to extract a plurality of content features 810. Further, each of the plurality of content features 810 may be inputted into the content classification 540, and then a corresponding content type may be obtained for each paragraph. With these embodiments, each paragraph may be classified into one of the plain text type, the system log type, the command-line type, the configuration type, and the URL type.

Having described how to determine the content type of each paragraph, reference will be made back to FIG. 6 for details about determining a semantic type of a note. At a block 630, the plurality of notes are classified into a plurality of semantic types based on the plurality of content types and a syntactic parsing to the plurality of notes 520. With respect to each note in the plurality of notes 520, the syntactic parsing may be implemented to all paragraphs in each note. According to one embodiment of the present invention, a note feature may be determined for each note based on all the paragraphs in the note, and reference will be made to FIG. 9 for a brief of the note feature.

Figure 9:
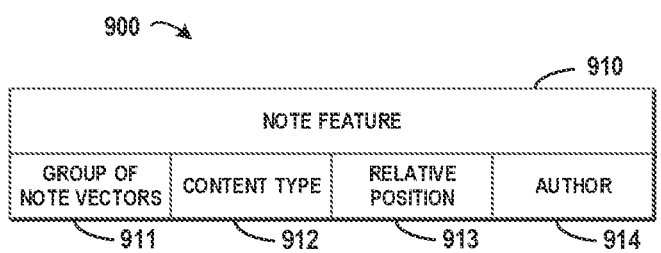
FIG. 9 depicts an example data structure of a note feature according to an embodiment of the present invention.
Figure 10A:
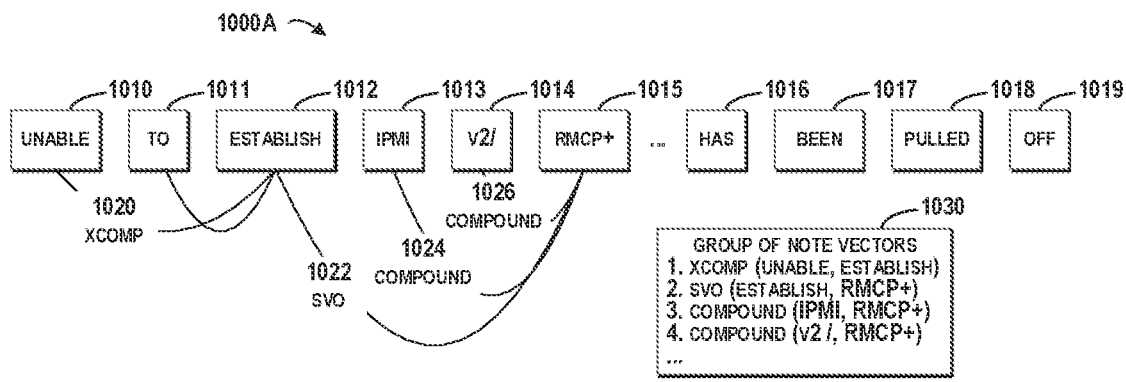
FIG. 10A-10C depict example procedures for extracting dependencies from paragraphs according to an embodiment of the present invention.
Figure 10B:
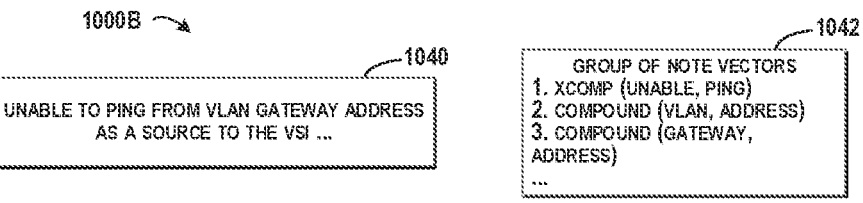
Figure 10C:
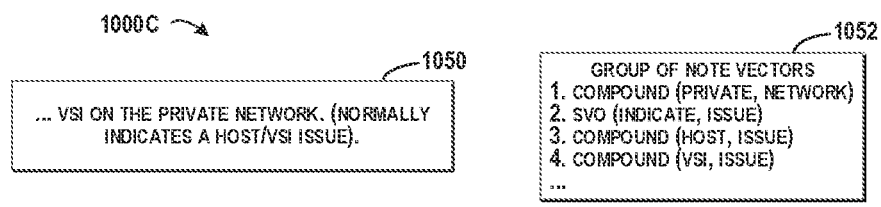

FIG. 9 depicts an example data structure 900 of a note feature 910 according to an embodiment of the present invention. In FIG. 9, the note feature 910 may include multiple fields such as a group of note vectors 911, a content type 912, a relative position 913, and an author 914. According to one embodiment of the present invention, each note may be analyzed for generating a group of note vectors 911. Specifically, each paragraph that is comprised in the note may be analyzed for extracting at least one syntactic dependency therefrom, and then the at least one syntactic dependency may be used for determining the group of note vectors. Specifically, each paragraph may be processed for determining all the dependencies. Reference will be made to FIGS. 10A-10C for details.

As paragraphs of the plain text type include complex natural language meanings and involve more unstructured information, only paragraphs that are classified into the plain text type may be subject to the syntactic parsing. According to one embodiment of the present invention, if the paragraph is classified into the plain text type, the paragraph may be analyzed for extracting at least one dependency.

FIG. 10A depicts an example procedure for extracting syntactic dependencies from paragraphs according to an embodiment of the present invention. In FIG. 10A, reference numbers 1010-1019 represent words in a paragraph "unable to establish IPMI v2/RMCP+ . . . has been pulled off" Although the paragraph here includes only one sentence, in other examples, the paragraph may include more sentences and each sentence may be processed in a similar manner. In FIG. 10A, words may be extracted from the paragraph and then the syntactic parsing may be implemented for determining the dependency between these words. According to one embodiment of the present invention, a syntactic parsing toolkit (such as the spaCy) may be used for extracting the dependency. For example, multiple types of dependencies may be defined in advance. Depending on details of the syntactic parsing, the dependencies may include more or less types. In one example, the following types may be defined: a ROOT type, an SVO type, a COMPOUND type, a NEGATIVE type and an XCOMP type.

In these embodiments, each of these dependencies may be represented by a triple "relation (governor, dependent)," where the relation indicates a dependency type among the above five types. For example, the SVO type may indicate a subject-verb-object dependency, which may be divided into: a NSUBJ (nominal subject) type, a NSUBJPASS (nominal subject (passive)) type, a DOBJ (direct object) type, and an AGENT (agent) type. The COMPOUND type may be used to define the noun phrases, which may be divided into a COMPOUND (compound modifier) type, an NMOD (modifier of nominal) type, and an AMOD (adjectival modifier) type. The NEGATIVE (negation modifier)

type may indicate a negative meaning, and the XCOMP may indicate an open clausal complement.

Each paragraph in the note may be analyzed and a group of vectors may be generated from the dependencies. In FIG. 10A, as shown by the line 1020, the XCOMP type dependency exists between the word 1010 and 1012, and thus the vector may be represented as "XCOMP (unable, establish)." The line 1022 indicates that the SVO type dependency exists between the word 1012 and 1015, and thus the vector may be represented as "SVO (establish, RMCP+)." The line 1024 indicates that the COMPOUND type dependency exists between the word 1013 and 1015, and thus the vector may be represented as "COMPOUND (IPMI, RMCP+)." Moreover, the line 1026 indicates that the COMPOUND type dependency exists between the word 1014 and 1015, and thus the vector may be represented as "COMPOUND (V2/, RMCP+)." It is to be understood that the above vectors are just examples that are generated from the paragraph, other portion of the paragraph may be processed in a similar manner for extracting other vectors in the group of note vectors 1030.

FIGS. 10B and 10C depict other example procedures for extracting dependencies from paragraphs according to an embodiment of the present invention. In FIG. 10B, an example sentence 100B depicting the sentence "unable to ping from VLAN gateway address as a source to the VSI . . . " in the paragraph 1040 may be analyzed and then a group of note vectors 1042 may be extracted. For example, "XCOMP (unable, ping)" indicates that the XCOMP type dependency exists between the words "unable" and "ping." In FIG. 10C, the example sentence 1000C depicts " . . . VSI on the private network. (normally indicates a host/VSI issue)" in the paragraph 1050 may be analyzed and then a group of note vectors 1052 may be extracted.

It is to be understood that the above FIGS. 10A-10C are just examples for extracting the group of vectors. Alternatively and/or in addition to, other syntactic parsing algorithms may be adopted for processing each paragraph in the note. Further, the group of note vectors obtained from each paragraph may be combined to determine a plurality of note vectors for the note. Based on the above, each of the plurality of notes 520 may be processed and then the plurality of note vectors may be obtained for the note based on the dependencies extracted from each paragraph.

As shown in FIGS. 10A-10C, each vector is represented by a triple including three members. To avoid the data sparse problem caused by the triple form, the triple may be divided into two tuples. For example, the triple "relation (governor, dependent)" may be divided into two two-tuples: (rel-gov, governor), and (rel-dep, dependent). Accordingly, the number of the vectors in each group of note vectors may be doubled. Supposing a note includes only one paragraph as shown in FIG. 10A, and the group of note vectors 1030 includes 4 vectors, then the group may include 4*2=8 two-tuples as shown in Table 3. Based on the above, the group of note vectors 911 may be generated for each note. It is to be understood that, the paragraph may include pronouns such as "it," "they" and the like. As vectors including these pronouns do not have a clear meaning, these vectors may be removed before generating the note feature.

TABLE 3

| Example Two-tuples | |
|---|---|
| No. | Two-tuple |
| 1 | (XCOMP- gov, unable) |
| 2 | (XCOMP- dep, establish) |

TABLE 3-continued

| Example Two-tuples | |
|---|---|
| No. | Two-tuple |
| 3 | (SVO- gov, establish) |
| 4 | (SVO- dep, RMCP+) |
| 5 | (COMPOUND - gov, IPMI) |
| 6 | (COMPOUND - dep, RMCP+) |
| 7 | (COMPOUND - gov, V2/) |
| 8 | (COMPOUND - dep, RMCP+) |

Referring back to FIG. 9, the note feature 910 may include the content type 912. Here, the content type 912 may be determined based on the content classifying mode 820 as shown in FIG. 8. The note feature 910 may include a relative position 913, which may be determined based on the relative position of the note and the number of the all the notes in the event record. Further, the note feature 910 may include the author 914, which is determined by the following Formula 1. For example, if a note is written by a user who creates the event record, the author may be set to 0. If a note is added by the last engineer who processes the event record, the author may be set to 1; otherwise, the author may be set to −1. With these embodiments, the note feature 910 may describe various aspects of the note, and thus the note feature 910 may include effective information for determining the semantic meaning of the note.

$$\text{author} = \begin{cases} 0, \text{ if author is the event record creator} \\ 1, \text{ if author is the last event record processor} \\ -1, \text{ others} \end{cases} \quad \text{Formula 1}$$

According to one embodiment of the present invention, each of the plurality of notes 520 may be processed in a similar manner, and thus a corresponding note feature may be obtained for each note. Accordingly, a plurality of note features may be obtained for the plurality of notes 520 based on the plurality of content types 830 and the syntactic parsing to the plurality of notes 520. Further, the plurality of note features may be used to determine a semantic type of the note. Here, the machine learning technique may be used for classifying the plurality of notes 520. Specifically, a semantic classifying model may be obtained for representing an association between a note feature for a note and a semantic type of the note. Here, the plurality of semantic types may include a symptom type and a resolution type. It is to be understood that the present invention aims at obtaining knowledge for handling an event having a specific symptom by a specific resolution, therefore the notes that are classified into the symptom type and the resolution type may help to build the knowledge database. As these notes are collected from history event records and the history events have been solved by technical engineers, these notes can provide correct knowledge for managing another event in the future.

Further, the plurality of semantic types may include a diagnose operation type and an analysis result type. With these embodiments, these semantic types may clearly represent the semantic meaning of each note, and thus the classification may be implemented in a more accurate and effective way. The symptom classifying model may be trained in advance based on the machine learning technique. For example, a training dataset including multiple data samples may be obtained, and each data sample may include a note and a corresponding semantic type of the note which is labeled by the technical experts. For example, the plurality of semantic types may comprise the symptom type, the resolution type, the diagnose operation type, and the analysis result type. Further, a corresponding note feature may be extracted from each note and then each data sample may indicate an association between the note feature of the note and a corresponding semantic type of the note.

It is to be understood that the above paragraph just provides a general procedure for training the semantic classifying model. Alternatively, and/or in addition to, the semantic classifying model may be obtained by methods that have been provided in the past or to be developed in the future. Meanwhile, various machine learning models may be used for representing the semantic classifying model, as along as the trained model may indicate the association between note features and semantic types.

Figure 11:
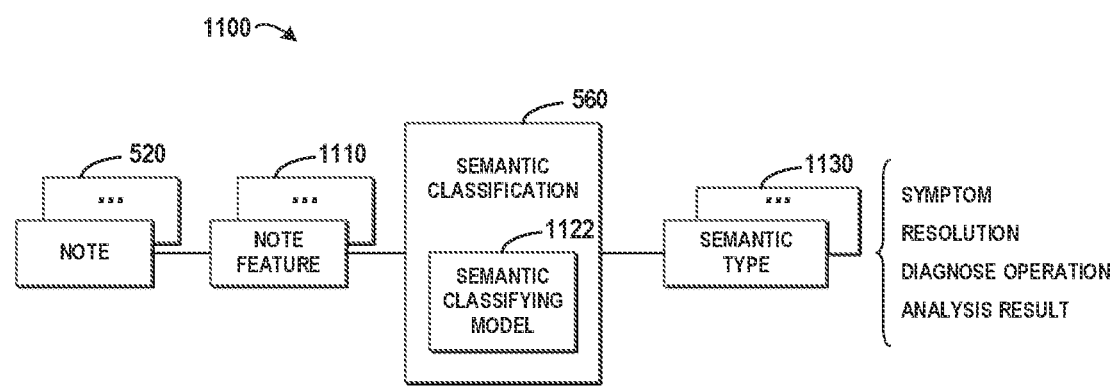
FIG. 11 depicts an example procedure for classifying a plurality of notes into a plurality of semantic types according to an embodiment of the present invention.

The semantic classifying model may be trained by data samples in the training dataset, such that the semantic classifying model may represent an association between a note feature of a note and a semantic type of the note. Further, the plurality of note 520 may be classified into the plurality of semantic types based on the plurality of note features and the semantic classifying model. FIG. 11 depicts an example procedure 1100 for classifying a plurality of notes into a plurality of semantic types according to an embodiment of the present invention. As depicted in FIG. 11, once the semantic classifying model 1122 is trained, it may be used for the semantic classification 560. The plurality of notes 520 may be processed to extract a plurality of note features 1110. Further, each of the plurality of note features 1110 may be inputted into the semantic classification 560, and then a corresponding semantic type (e.g., semantic type 1130) may be obtained for each note. With these embodiments, each note may be classified into one of the symptom type, the resolution type, the diagnose operation type, and the analysis result type.

Based on the above, all the notes are classified into one of the above four semantic types, and only notes that are classified into the symptom type and the resolution type may be used to generate the knowledge item. Referring back to FIG. 6, at a block 640, a knowledge item is generated for managing an event in the computer system based on a group of notes in the plurality of notes that are classified into the plurality of semantic types including the symptom type and the resolution type. According to one embodiment of the present invention, a portion of notes that are classified into the symptom type may be selected from the plurality of notes. Supposing there are 10000 notes in total and 1000 of them are classified into the symptom type, then the 1000 notes may be selected for generating the knowledge item.

During the operations of the computer system, various events may occur and then the symptom notes may involve various problems of the computer system. For example, some notes in the selected symptom notes may describe connection errors, and some notes may describe requests for expanding the storage space. Accordingly, the selected portion of notes may be further classified to get typical problems. Specifically, the plurality of symptom notes may be clustered into a plurality of problem types, and a problem type in the plurality of problem types represents a problem related to an event that occurred in the computer system. For example, the note feature may be generated based on Word2Vec and the clustering may be implemented based on the DBSCAN technique. Continuing the above example, the 1000 selected symptom notes may be further classified into two typical problem types: the connection error type and the expanding request type. It is to be understood that the above two problem types are just examples, alternatively and/or in addition to, the problem types may involve more types such as a disk failure type, an operation system error type and the like. For example, the 1000 symptom notes may be classified into a first group including 400 notes related to the connection error type and a second group including 600 notes related to the expanding request type.

Moreover, with respective to a group of symptom notes that are classified into the problem type in the portion of notes, a group of resolution notes that are classified into the resolution type may be obtained from a group of event records that respectively comprising the group of symptom notes. Continuing the above example, event records including the first group of notes related to the connection error may be selected from the plurality of event records 510, i.e., 400 event records may be selected. Then, corresponding notes in the selected event records that are classified into the resolution may be identified as resolutions for handling the connection error. At this point, 400 resolution notes may be found for further processing. Next, based on the group of symptom notes and the group of resolution notes, the knowledge item may be generated for processing an event that has a symptom of the symptom type by a resolution that is classified into the resolution type. In other words, both of the symptom notes and the resolution notes are related to the connection error, and then a pair of symptom and resolution may be extracted for providing accurate grounds in building the knowledge item for handling the connection error.

During the operations of the computer system, different reasons may cause the same problem. In the satiation of the connection error, the cause may involve a hardware aspect (such as a failure in a connection cable) and a software aspect (such as incorrect connection configurations). In the history resolution, the engineers have found the failure causes, fixed the failures, and wrote the repairing procedure into the resolution notes. Therefore, the resolution notes may include different failure problems and the corresponding resolution. Considering the above, these resolution notes may be further classified into a plurality of sub-resolution types, and a sub-resolution type in the plurality of sub-resolution types represents an operation for processing the event that has the symptom of the symptom type.

Continuing the above example, based on the first group of symptom notes related to the connection errors, a group of resolution notes related to connection errors may be found and then classified into multiple types. For example, one type may relate to failures in the hardware aspect, and the failure may be recovered by for example replacing the failed connection cable with a new one. Another type may relate to failures in the software aspect, and the failure may be recovered by updating the connection configurations. Based on the group of symptom notes and a sub-group of resolution notes that are classified into the sub-resolution type, the knowledge item may be refined for representing various causes and sub-resolutions for handling the same symptom. Therefore, the accuracy of the knowledge item may be greatly increased.

According to one embodiment of the present invention, in order to increase the readability of the knowledge item, the selected symptom notes and resolution notes may be subject to a text analysis for extracting summaries. For example, existing methods such the TextRank algorithms may be used for determining a symptom summary from the group of symptom notes and a resolution summary from the sub-group of resolution notes, respectively. Specifically, the group of symptom notes may be inputted into the TextRank processing tool for obtaining a symptom summary. At this point, the symptom summary may describe the typical symptom in natural language and thus the users and/or the engineers may clearly understand the symptom that showed in the computer system when the connection error occurs. Similarly, the resolution summary may be obtained as well, and the resolution summary may explicitly direct the users and/or the engineers to remove the failures in the computer system.

Having described how to generate the knowledge item in the knowledge database, the generated knowledge item may be used for trouble shooting in the computer system. If a user finds his/her terminal device cannot access to the storage system via the network, he/she may describe the symptom and submit it as an event to the engineer. The submitted event may be searched in the knowledge database for a corresponding resolution. If the symptom matches a target problem type in the knowledge database, then the engineer may try to fix the problem based on the resolution matching a target problem type.

In the situation of the connection error, if the symptom submitted by the user matches the symptom of the connection error in the knowledge database, the two resolutions (including the hardware and the software aspects) may be provided to the engineer for reference. Next, the engineer may try the two candidate resolutions one by one to solve the problem. With these embodiments, the knowledge database may provide accurate and effective resolutions, and then the computer system may be repaired in a more effective way.

Although the above disclosure describes the present invention by taking the storage system as an example computer system, embodiments of the present invention may be implemented in other computer systems such as a network system, a computing system, an email system and the like. Depending on functions of the computer system, the history event records may be analyzed to obtain the corresponding knowledge items. With these embodiments, the event management procedure does not require any background knowledge about the specific computer system, and all the knowledge is learned from the history event records. Therefore, the event management procedure may be easily adopted in various computer systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, a plurality of notes that are comprised in a plurality of event records in a computer system, an event record in the plurality of event records describing an event that occurred in the computer system;
    classifying, by one or more processors, a plurality of paragraphs that are comprised in the plurality of notes into a plurality of content types based on a content analysis of the plurality of paragraphs;
    classifying, by one or more processors, the plurality of notes into a plurality of semantic types based on the plurality of content types and a syntactic parsing to the plurality of notes, the plurality of semantic types comprising at least a symptom type and a resolution type; and
    generating, by one or more processors, a knowledge item for managing an event in the computer system based on a group of notes in the plurality of notes that are classified into the plurality of semantic types.

2. The computer-implemented method of claim 1, wherein the classifying the plurality of paragraphs into the plurality of content types comprises:
    determining, by one or more processors, a plurality of content features for the plurality of paragraphs based on the content analysis to the plurality of paragraphs, respectively;
    obtaining, by one or more processors, a content classifying model that represents an association between a content feature of a paragraph and a content type of the paragraph; and
    classifying, by one or more processors, the plurality of paragraphs into the plurality of content types based on the plurality of content features and the content classifying model.

3. The computer-implemented method of claim 2, wherein the determining the plurality of content features for the plurality of paragraphs respectively comprises: with respect to a paragraph in the plurality of paragraphs, determining, by one or more processors, a content feature for the paragraph based on at least one of:
    a length of the paragraph;
    a position of the paragraph;
    a number of special characters in the paragraph;
    a number of special tokens in the paragraph; and
    statistic data associated with words in the paragraph.

4. The computer-implemented method of claim 1, wherein the classifying the plurality of notes into the plurality of semantic types comprises:
    determining, by one or more processors, a plurality of note features for the plurality of notes based on the plurality of content types and the syntactic parsing to the plurality of notes, respectively;
    obtaining, by one or more processors, a semantic classifying model that represents an association between a note feature for a note and a semantic type of the note, the plurality of semantic types further comprising a diagnose operation type and an analysis result type; and
    classifying, by one or more processors, the plurality of notes into the plurality of semantic types based on the plurality of note features and the semantic classifying model.

5. The computer-implemented method of claim 4, wherein the determining the plurality of note features for the plurality of notes respectively comprises: with respect to a note in the plurality of notes,
    generating, by one or more processors, a plurality of note vectors for the note based on the syntactic parsing to each paragraph that is comprised in the note; and
    determining, by one or more processors, a note feature for the note based on a content type of each paragraph and at least one of: the plurality of note vectors, a relative position of each paragraph, and an author of the note.

6. The computer-implemented method of claim 5, wherein the generating the plurality of note vectors for the note comprises:
    with respect to each paragraph that is comprised in the note, extracting, by one or more processors, at least one dependency from each paragraph based on the syntactic parsing; and
    generating, by one or more processors, the plurality of note vectors for the note based on the at least one dependency extracted from each paragraph.

7. The computer-implemented method of claim 6, wherein the extracting the at least one dependency from each paragraph comprises: with respect to a paragraph that is comprised in the note, in response to the paragraph being classified into a plain text type, extracting, by one or more processors, at least one dependency from the paragraph based on the syntactic parsing.

8. The computer-implemented method of claim 1, wherein the generating the knowledge item for managing the event in the computer system comprises:

selecting, by one or more processors, a portion of notes in the plurality of notes that are classified into the symptom type;

clustering, by one or more processors, the portion of notes into a plurality of problem types, a problem type in the plurality of problem types represents a problem of an event that occurred in the computer system;

with respective to a group of symptom notes that are classified into the symptom type in the portion of notes, obtaining, by one or more processors, a group of resolution notes that are classified into the resolution type from a group of event records that respectively comprising the group of symptom notes; and generating, by one or more processors, the knowledge item for processing an event that has a problem of the problem type by a resolution that is classified into the resolution type based on the group of symptom notes and the group of resolution notes.

9. The computer-implemented method of claim 8, wherein the generating the knowledge item based on the group of symptom notes and the group of resolution notes comprises:

classifying, by one or more processors, the group of resolution notes into a plurality of sub-resolution types, a sub-resolution type in the plurality of sub-resolution types representing an operation for processing the event that has the problem of the problem type; and generating, by one or more processors, the knowledge item based on the group of symptom notes and a sub-group of resolution notes that are classified into the sub-resolution type.

10. The computer-implemented method of claim 9, wherein the generating the knowledge item based on the group of symptom notes and the sub-group of resolution notes comprises:

determining, by one or more processors, a symptom summary from the group of symptom notes and a resolution summary from the sub-group of resolution notes based on a text analysis, respectively; and generating, by one or more processors, the knowledge item based on the symptom summary and the resolution summary.

11. The computer-implemented method of claim 8, further comprising:

in response to a target event occurred in the computer system, determining, by one or more processors, from the knowledge item a resolution matching a target problem type of the target event.

12. A computer system comprising:

one or more computer processors;

one or more computer readable storage media; and program instructions stored on the one or more computer readable storage media for execution by at least one of the one or more computer processors, the program instructions comprising:

program instructions to obtain a plurality of notes that are comprised in a plurality of event records in a computer system, an event record in the plurality of event records describing an event that occurred in the computer system;

program instructions to classify a plurality of paragraphs that are comprised in the plurality of notes into a plurality of content types based on a content analysis of the plurality of paragraphs;

program instructions to classify the plurality of notes into a plurality of semantic types based on the plurality of content types and a syntactic parsing to the plurality of notes, the plurality of semantic types comprising at least a symptom type and a resolution type; and program instructions to generate a knowledge item for managing an event in the computer system based on a group of notes in the plurality of notes that are classified into the plurality of semantic types.

13. The computer system of claim 12, wherein the program instructions to classify the plurality of paragraphs into the plurality of content types comprise:

program instructions to determine a plurality of content features for the plurality of paragraphs based on the content analysis to the plurality of paragraphs, respectively;

program instructions to obtain a content classifying model that represents an association between a content feature of a paragraph and a content type of the paragraph; and program instructions to classify the plurality of paragraphs into the plurality of content types based on the plurality of content features and the content classifying model.

14. The computer system of claim 13, wherein the program instructions to determine the plurality of content features for the plurality of paragraphs respectively comprise: with respect to a paragraph in the plurality of paragraphs, program instructions to determine a content feature for the paragraph based on at least one of:

a length of the paragraph;

a position of the paragraph;

a number of special characters in the paragraph;

a number of special tokens in the paragraph; and statistic data associated with words in the paragraph.

15. The computer system of claim 12, wherein the program instructions to classify the plurality of notes into the plurality of semantic types comprise:

program instructions to determine a plurality of note features for the plurality of notes based on the plurality of content types and the syntactic parsing to the plurality of notes, respectively;

program instructions to obtain a semantic classifying model that represents an association between a note feature for a note and a semantic type of the note, the plurality of semantic types further comprising a diagnose operation type and an analysis result type; and program instructions to classify the plurality of notes into the plurality of semantic types based on the plurality of note features and the semantic classifying model.

16. The computer system of claim 15, wherein the program instructions to determine the plurality of note features for the plurality of notes respectively comprise: with respect to a note in the plurality of notes, program instructions to generate a plurality of note vectors for the note based on the syntactic parsing to each paragraph that is comprised in the note; and program instructions to determine a note feature for the note based on a content type of each paragraph and at least one of: the plurality of note vectors, a relative position of each paragraph, and an author of the note.

17. The computer system of claim 16, wherein the program instructions to generate the plurality of note vectors for the note comprise:

with respect to each paragraph that is comprised in the note, program instructions to extract at least one dependency from each paragraph based on the syntactic parsing; and program instructions to generate the plurality of note vectors for the note based on the at least one dependency extracted from each paragraph.

18. The computer system of claim 12, wherein the program instructions to generate the knowledge item for managing the event in the computer system comprise:

program instructions to select a portion of notes in the plurality of notes that are classified into the symptom type;

program instructions to classify the portion of notes into a plurality of problem types, a problem type in the plurality of problem types represents a problem of an event that occurred in the computer system;

with respective to a group of symptom notes that are classified into the symptom type in the portion of notes, program instructions to obtain a group of resolution notes that are classified into the resolution type from a group of event records that respectively comprising the group of symptom notes; and program instructions to generate the knowledge item for processing an event that has a problem of the problem type by a resolution that is classified into the resolution type based on the group of symptom notes and the group of resolution notes.

19. The computer system of claim 18, wherein the generating the knowledge item based on the group of symptom notes and the group of resolution notes comprises:

program instructions to classify the group of resolution notes into a plurality of sub-resolution types, a sub-resolution type in the plurality of sub-resolution types representing an operation for processing the event that has the problem of the problem type; and program instructions to generate the knowledge item based on the group of symptom notes and a sub-group of resolution notes that are classified into the sub-resolution type; and in response to a target event occurred in the computer system, program instructions to determine from the knowledge item a resolution matching a target problem type of the target event.

20. A computer program product comprising:

one or more computer readable storage media and program instructions stored on the one or more computer readable storage media, the program instructions comprising:

program instructions to obtain a plurality of notes that are comprised in a plurality of event records in a computer system, an event record in the plurality of event records describing an event that occurred in the computer system;

program instructions to classify a plurality of paragraphs that are comprised in the plurality of notes into a plurality of content types based on a content analysis of the plurality of paragraphs;

program instructions to classify the plurality of notes into a plurality of semantic types based on the plurality of content types and a syntactic parsing to the plurality of notes, the plurality of semantic types comprising at least a symptom type and a resolution type; and program instructions to generate a knowledge item for managing an event in the computer system based on a group of notes in the plurality of notes that are classified into the plurality of semantic types.

* * * * *